United States Patent
Bell (10) Patent No.: US 11,458,860 B2
(45) Date of Patent: Oct. 4, 2022

(54) OFF-BOARD INVERTER VEHICLE INTERFACE SYSTEM

(71) Applicant: Ford Global Technologies, LLC, Dearborn, MI (US)

(72) Inventor: Christopher W. Bell, Livonia, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 325 days.

(21) Appl. No.: 16/745,023

(22) Filed: Jan. 16, 2020

(65) Prior Publication Data

US 2021/0221248 A1   Jul. 22, 2021

(51) Int. Cl.
  *B60L 55/00* (2019.01)
  *B60L 58/12* (2019.01)
  *H04L 12/40* (2006.01)

(52) U.S. Cl.
  CPC ............ *B60L 55/00* (2019.02); *B60L 58/12* (2019.02); *B60L 2210/10* (2013.01); *B60L 2240/44* (2013.01); *H04L 12/40013* (2013.01)

(58) Field of Classification Search
  CPC ...... B60L 55/00; B60L 58/12; B60L 2210/10; B60L 2240/44; H04L 12/40013
  USPC ............................................... 701/22
  See application file for complete search history.

(56) References Cited

U.S. PATENT DOCUMENTS

| | | |
|---|---|---|
| 6,649,289 B2 | 11/2003 | Hsu et al. |
| 2018/0273022 A1 | 9/2018 | Bell |
| 2018/0334036 A1 | 11/2018 | Gibeau et al. |

FOREIGN PATENT DOCUMENTS

CA    2266677 C   *   8/2006   ............. B60L 58/30

* cited by examiner

*Primary Examiner* — Hal Kaplan
(74) *Attorney, Agent, or Firm* — David B. Kelley; Brooks Kushman, P.C.

(57) ABSTRACT

A vehicle interface system configured to be arranged between a vehicle and an off-board inverter, may include a first cable configured to connect to the vehicle via a first connector; a second cable configured to connect to an inverter via a second connector; and a transceiver configured to transmit interface data to the vehicle indicating the presence of a load connected at the second connector and receive vehicle data including instructions to transmit power from the first connector to the second connector.

20 Claims, 5 Drawing Sheets

OFF-BOARD INVERTER VEHICLE INTERFACE SYSTEM

TECHNICAL FIELD

Aspects of the disclosure generally relate to off-board inverter vehicle interface systems.

BACKGROUND

Electrified vehicles today can produce large amounts of power for on-board and off-board use. On-board loads may include traction motors, vehicle accessories, and other loads associated with vehicle operation. Off-board loads, referred to as auxiliary loads, are not associated with operation of the electrified vehicle. They may receive power through a direct current (DC)-to-alternating current (AC) inverter. These auxiliary loads may include various devices requiring power such as appliances, computer equipment, mobile homes, or military-based weapons systems. The power available to off-board or auxiliary loads may fluctuate based on the power requirements of the electrified vehicle, particularly the powertrain. This may result in possible damage to the powered device or, at a minimum, operator dissatisfaction.

SUMMARY

An off-board vehicle interface system configured to be arranged between a vehicle and an off-board inverter, may include a first cable configured to connect to the vehicle via a first connector; a second cable configured to connect to an inverter via a second connector; and a transceiver configured to transmit interface data to the vehicle indicating the presence of a load connected at the second connector and receive vehicle data including instructions to transmit power from the first connector to the second connector.

An off-board vehicle system configured to be arranged between a vehicle and an off-board inverter may include an interface; a first cable configured to connect the interface to the vehicle via a first connector; and a second cable configured to connect the interface to an inverter via a second connector; the interface including a controller configured to instruct a transceiver to transmit interface data to the vehicle indicating the presence of a load connected at the second connector; and instruct the first connector and second connector to transmit power therebetween.

An electrified vehicle auxiliary power interface may include an input connector configured to connect to an electrified vehicle; an output connector configured to connect to an auxiliary load; a transceiver configured to transmit data to the electrified vehicle indicating a load connected to the output connector and to receive vehicle data including instructions to transmit power from the input connector to the output connector; a power relay; and a controller configured to operate the power relay in response to the instructions received by the transceiver to transmit power from the input connector to the output connector.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles often have a power plant that is used to propel the vehicle and supply power to onboard loads. The power plant may include engines, batteries, capacitors, solar panels, fuel cells, or other generation devices. These generation devices may also be used to power off-board electronics by connecting jumper cables to vehicle electric busses or other electrical outlets. For example, the vehicles DC bus may be used to jumpstart a car or energize an inverter. The inverter may be used to power electronics designed for utility electrical connections (e.g., 120/240 V connectors). These connections may allow unauthorized or unanticipated loads to draw improper amounts of energy from vehicle electrical busses. These loads may lead to vehicle malfunction or cause other issues to arise.

Disclosed herein is an interface (module) configured to facilitate power transfer between the vehicle and an off-board inverter. PHEV and HEV systems may be equipped with a DC/DC converter capable of producing in excess of 2 kW of power. This power is available whenever the vehicle is keyed on. The interface may be off-board and be configured to easily connect to the vehicle, as well as the off-board inverter. The inverter may be an off-the-shelf 2 kW, 12V to 120 VAC inverter capable of powering devices such as microwaves, refrigerators, sump pumps, or any other load that may be powered by a conventional 120 v outlet.

The interface may connect to the vehicle via a port, such as a charge port, and a high voltage power cord. The interface may also connect to the vehicle communications network, such as a CAN, and a power conversion module 132. The vehicle controller may determine whether the vehicle is keyed on, and what type of power demand is being requested via the interface module and communications network. The interface may cooperate with either low or high voltage vehicle systems, without requiring the user to access the vehicle high voltage bus.

The interface allows any 12V to 120V or HV to 120V inverter to be safely powered by an electrified vehicle. The interface may connect to the vehicle and the commercial inverter via a quick disconnect for quick installation and removal. Communication with the vehicle network may allow power transfer to occur only when the connections are proper and complete, and prevent power transfer in the event of improper or incomplete connections. Further, when an inverter is not connected, an interlock prevents the connector and the interface from being powered.

Costly vehicle modifications are unnecessary. The system may operate on the low voltage line. If a larger load is required, the system may operate on the high voltage (HV) line. Measures may be in place to include low voltage countermeasures, while also allowing the HV options. Further measures ensure that the energy draw will not exceed a certain threshold.

The vehicle may include a controller to monitor the energy transferred and properly operate the vehicle in response to the circumstances surrounding the energy transfer. For example, the controller may start and stop an engine of the vehicle in response to a battery state of charge (SOC) falling below a predefined threshold and thus allowing the power needs of the inverter to be met.

Figure 1:
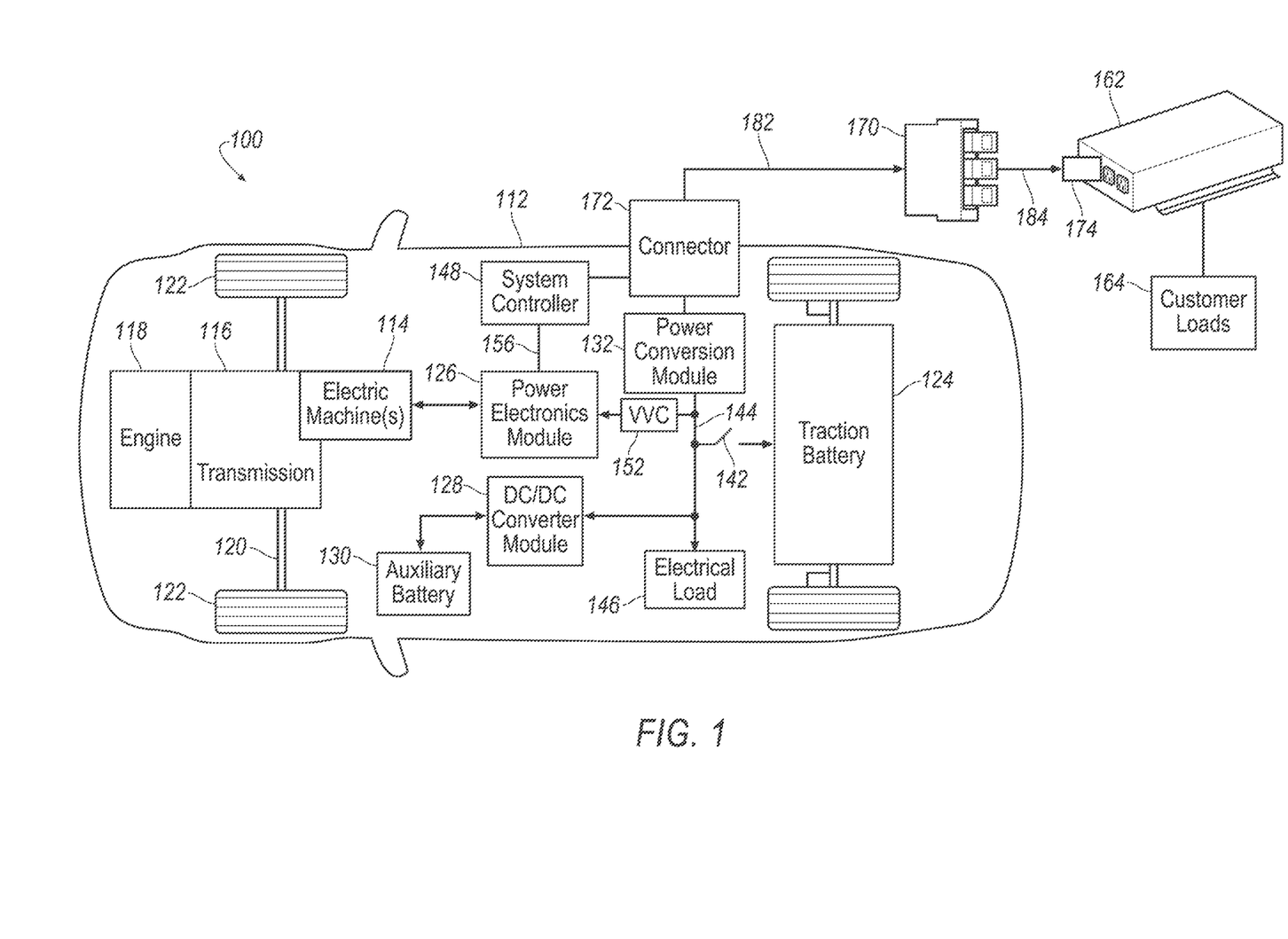
FIG. 1 illustrates an example diagram including a vehicle for an off-board inverter vehicle interface system.

FIG. 1 illustrates an example diagram including a vehicle 112 for an off-board inverter vehicle interface system 100. The vehicle 112 may include various types of passenger vehicles, such as a crossover utility vehicle (CUV), sport utility vehicle (SUV), truck, recreational vehicle (RV), boat, plane or other mobile machine for transporting people or goods. The vehicle 112 may be an electrified vehicle, such as a battery electric vehicle (BEV), plug-in hybrid vehicle (PHEV) or hybrid electric vehicle (HEV).

The vehicle 112 may comprise one or more electric machines 114 mechanically coupled to a transmission 116. The electric machines 114 may be capable of operating as a motor or a generator. In addition, the transmission 116 is mechanically coupled to an engine 118 for hybrid and plug-in hybrid implementations. The power plant of the vehicle may include any number of energy production or maintenance machines (e.g., engines, batteries, capacitors, solar panels, fuel cells, electric machines). The transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery 124 stores energy that can be used by the electric machines 114. The traction battery 124 may be considered a high voltage battery. The traction battery 124 may provide a high voltage direct current (DC) output. The traction battery 124 may be electrically coupled to one or more power electronic modules 126. One or more contactors 142 may isolate the traction battery 124 from other components when opened and connect the traction battery 124 to other components when closed. The power electronic module 126 is also electrically coupled to the electric machines 114 and provides the ability to bi-directionally transfer energy between the traction battery 124 and the electric machines 114. For example, a traction battery 124 may provide a DC voltage while the electric machine 114 may operate with a three-phase alternating current (AC) to function. The power electronic module 126 may convert the DC voltage to a three-phase AC current to operate the electric machine 114. In a regenerative mode, the power electronic module 126 may convert the three-phase AC current from the electric machine(s) 114 acting as generators to the DC voltage compatible with the traction battery 124.

The vehicle 112 may include a variable-voltage converter (VVC) 152 electrically coupled between the traction battery 124 and the power electronic module 126. The VVC 152 may be a DC/DC boost converter configured to increase or boost the voltage provided by the traction battery 124. By increasing the voltage, current requirements may be decreased leading to a reduction in wiring size for the power electronic module 126 and the electric machine 114. Further, the electric machine 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low voltage vehicle loads. An output of the DC/DC converter module 128 may be electrically coupled to an auxiliary battery 130 (e.g., 12V battery) for charging the auxiliary battery 130. The low voltage systems may be electrically coupled to the auxiliary battery 130. One or more on-board or integrally-connected or wired electrical loads 146 may be coupled to the high voltage bus. The electrical loads 146 may have an associated controller that operates and controls the electrical loads 146 when appropriate. Examples of electrical loads 146 may be a fan, an electric heating element and/or an air-conditioning compressor.

Electronic modules in the vehicle 112 may communicate via one or more vehicle networks. The vehicle network may include a plurality of channels for communication. One channel of the vehicle network may be a serial bus such as a Controller Area Network (CAN) 156. One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. A vehicle system controller (VSC) 148 may be present to coordinate the operation of the various components.

The electrified vehicle 112 may be configured to power an external or off-board auxiliary load 164. The auxiliary load may include common household loads such as refrigerators, microwaves, washing machines, garage door openers, etc. As used herein, external or off-board auxiliary loads may be any of a number of after-market devices that are not integrally wired to the vehicle electrical system and may be mobile devices temporarily connected to the vehicle by a consumer/user and contained within the vehicle, such as within the vehicle cabin, trunk, roof, storage compartment, etc. For example, an external or off-board device may include a sound system power amplifier, a refrigerator/cooler, a computer, etc. connected by a consumer/user to the vehicle electrical system and contained within the vehicle trunk, storage compartment, bed, etc. As such, references to an external or off-board auxiliary load does not require or imply that the load is outside of the vehicle cabin, trunk, storage compartment, etc. However, the present disclosure contemplates that the electrified vehicle may be used to power stationary auxiliary or external loads located outside of the vehicle, such as a connected RV, appliance, home, mobile home, etc. The auxiliary load 164 may be electrically coupled to a commercially available inverter 162. The inverter 162 may provide circuitry and controls to regulate and manage the transfer of energy between the auxiliary load 164 and the inverter 162. The system controller 148 may also provide or cooperate to control and regulate the energy transfer from the electrified vehicle through the interface 170 to the auxiliary load 164 as described herein.

The inverter 162 may contend with the dynamic traction power requirements typical when the vehicle 112 is being driven. The motor 114 may require power to propel the vehicle based on operator demand, while the inverter 162 may require a certain amount of power to support the auxiliary loads 164. According to an embodiment, the vehicle 112 may allocate a minimum amount of power to the inverter 162 via communication with, and control by, the interface 170 to avoid starving the inverter 162 of power during peak traction power demand events. As used herein, the term "allocate" may refer to providing power to the inverter 162 or reserving power to be provided to the inverter when required. The vehicle 112 may include a manual selector that permits an operator of the vehicle to allocate a specific amount of power developed by the vehicle's electrical system to the inverter 162 for off-board use of auxiliary loads 164. Alternatively, a user interface such as a vehicle touch screen or other HMI may be used to allocate a specific amount of power developed by the vehicle for off-board use of auxiliary loads 164. The specific amount would be a minimum amount of power that would be available from the high voltage bus 144 for inverter use at all times during the initiating drive event.

An interface 170 may be configured to connect the inverter 162 to the vehicle 112. The interface 170 is described in greater detail below. The interface 170 may be configured to connect to the vehicle via a first power cable 182 at a first quick disconnect connector 172. The interface 170 may be configured to connect to the inverter 162 via a second power cable 184 at a second quick disconnect connector 174.

Figure 2:
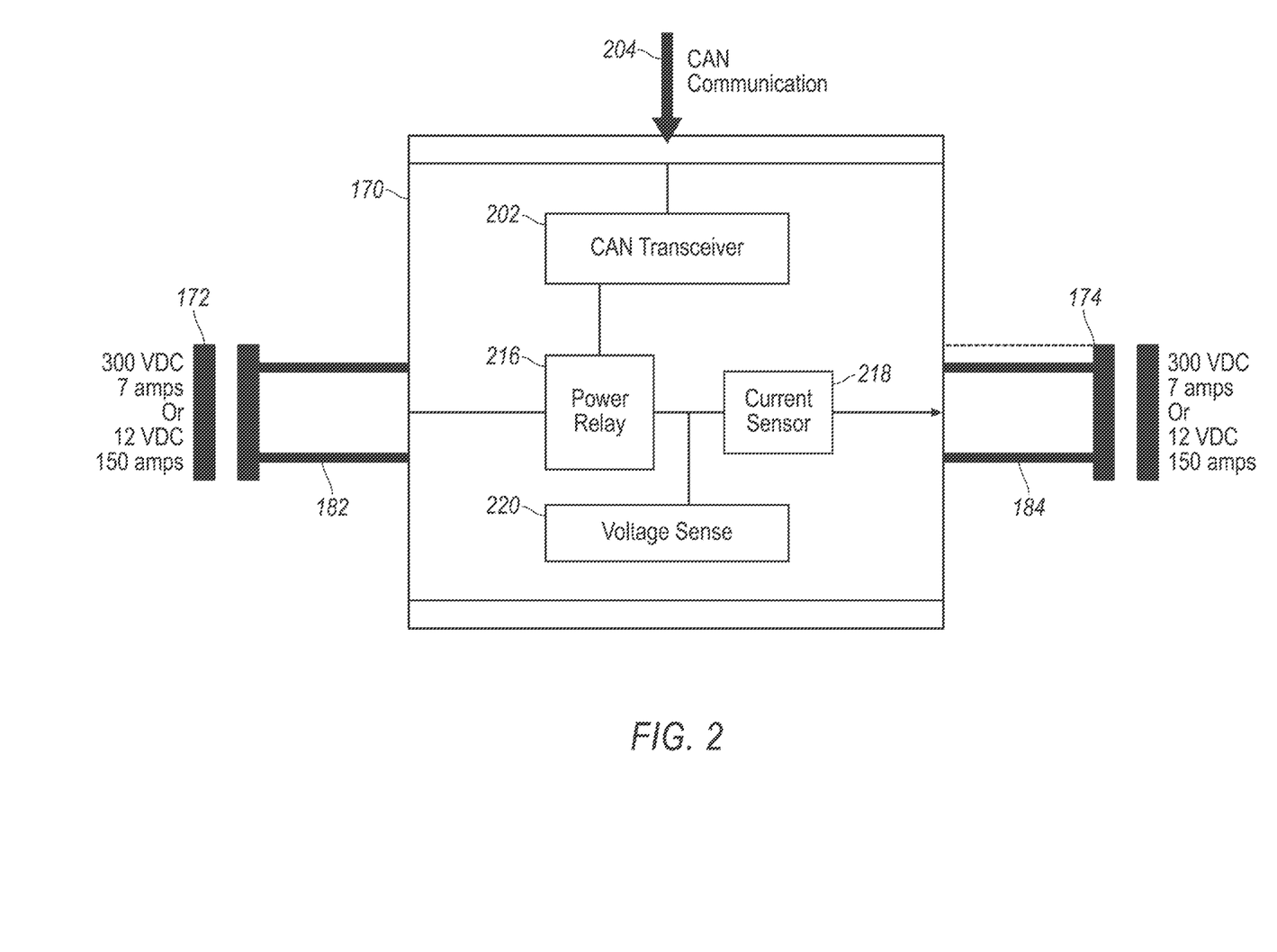
FIG. 2 illustrates the example vehicle interface for the system of FIG. 1.

FIG. 2 illustrates the example interface 170 for the system of FIG. 1. As explained, the interface 170 may be an off-board device configured to connect to the inverter 162 and vehicle 112. The interface 170 may include a CAN transceiver 202 configured to communicate over a CAN bus 204. The CAN bus 204 may transmit data and signals from the interface 170 to the vehicle CAN 156 (as shown in FIG. 1) via wired or wireless communication. The interface 170 may also include the first power cable 182 configured to transmit power from the vehicle 112 to the interface 170. The first power cable 182 may be capable of supporting low voltages, as well as high voltages and associated currents supplied to the interface 170. The first power cable 182 may provide an input voltage into the interface 170. The second power cable 184 may be configured to transmit power from the interface 170 to the inverter 162. Again, this second power cable 184 may be capable of supporting low voltages, as well as high voltages, and associated currents.

In the example shown in FIG. 2, the input and output voltages are equal or near equal. In this example, the voltages may be 12V (150 A), as supplied by the auxiliary battery 130. Additionally or alternatively, the voltages may be 300V (7 A), as supplied by the traction battery 124. Although shown separately, the wired coupling to CAN bus 204 and the first power cable 182 may be encased together.

The first power cable 182 may be connected at the vehicle. The second power cable 184 may be configured to connect to the inverter via the second quick disconnect connector 174. These quick disconnect connectors 172, 174 may allow for the interface 170 to be easily attachable to each of the vehicle 112 and the inverter 162. These connectors 172, 174 allow the inverter 162 to be stored during non-use. The connectors 172, 174 may be any type of port configured to transfer power from the vehicle 112 to the power cable 182 and from the interface 170 to the inverter 162. The connectors 172, 174 may have pins that mate with corresponding recesses. Alternatively, various components described as being electrically coupled or connected may transfer power using a wireless inductive coupling.

In one example, the connectors 172, 174 may include a plurality of conductors. One of the conductors may be configured as a pilot connector. The pilot connector establishes a connection with the associated power cable 182, 184 when it is plugged into the connector 172, 174, and before the vehicle 112 supplies power to the interface 170 and eventually the load 164. An authorization handshake is performed between the interface 170 and the vehicle 112 to ensure the interface 170 is authorized to receive power from the vehicle 112. The connectors 172, 174 may also include a power conductor. The power conductor may be configured to transfer energy required by the interface 170. Some inverters 162 may have large current draws (e.g., 150 A). The connectors 172, 174 may include contactors to close the circuit including the power conductor after the interface 170 is authorized.

The interface 170 may include a power relay 216 configured to open and close the connection between a current sensor 218 and the input voltage. The current sensor 218 may be arranged in communication with the power relay 216. The current sensor 218 may be configured to detect the electrical current coming from the power relay 216. A voltage sensor 220 may also be arranged in communication with the power relay 216 and may be configured to detect the voltage at the power relay 216. The voltage detected by the voltage sensor 220 and the current detected by the current sensor 218 may be controlled to provide the appropriate voltage and current from the vehicle 112. Furthermore, the voltage sensor may be configured to detect the power draw from the inverter 162. In response to the power draw exceeding the available power, the interface 170 may control relay 216 to open. Similarly, the relay may open in response to the current exceeding the allowed design current to provide overcurrent protection.

Figure 3:
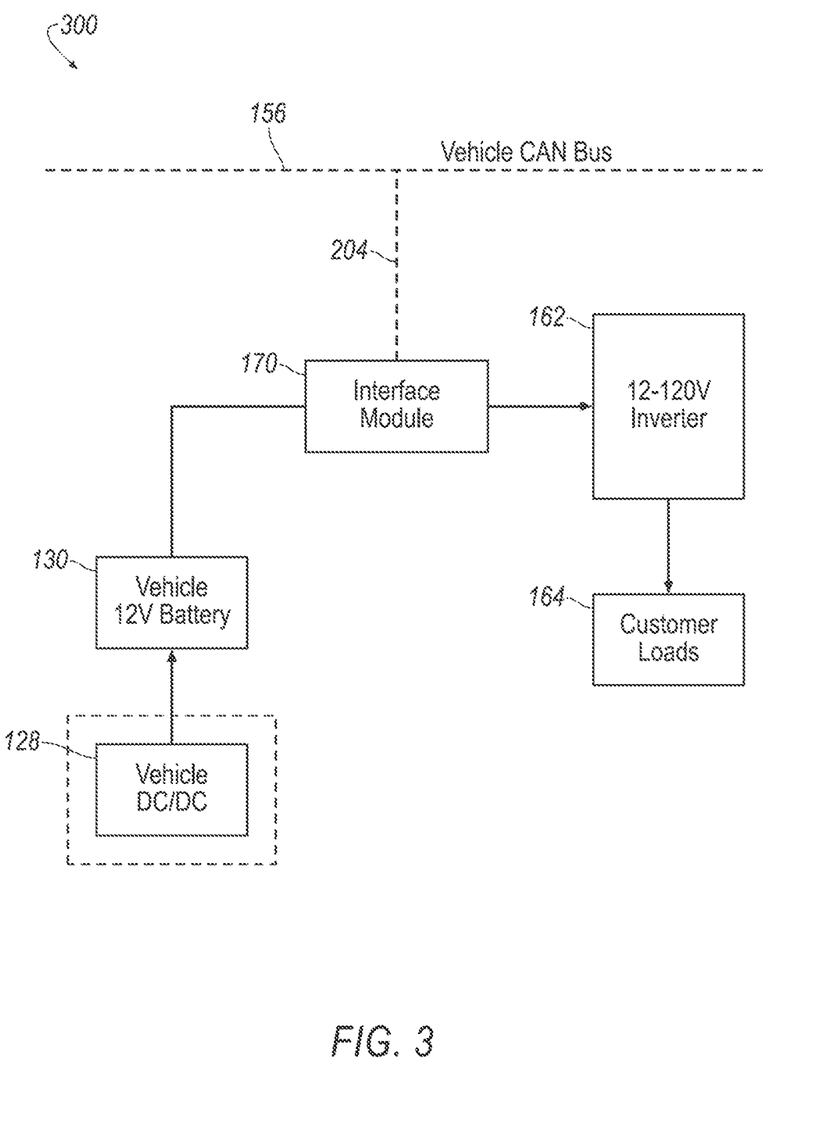
FIG. 3 illustrates an example block diagram for a low voltage vehicle interface for the system of FIG. 1.

FIG. 3 illustrates an example block diagram for a low voltage system 300 of FIG. 1. The low voltage system 300 may include the interface 170 configured to connect to the inverter 162 to supply customer load 164. The interface 170 may also connect to the auxiliary battery 130 to provide a low voltage to the inverter 162. The interface 170 may be configured to only provide voltage to the inverter in response to the vehicle being keyed on. This signal may be provided from the CAN bus wired or wireless connection 204 via the vehicle CAN 156.

The interface 170 may also monitor the system voltage to prevent low voltage conditions. A low voltage condition may arise where the inverter 162 is requesting more power than is available. The relay 216, as shown in FIG. 2, may open in response to such a low voltage condition. Thus, the power relay 216 may open in response to recognizing a low voltage condition, an over-current condition, or upon receiving instructions from the CAN bus 204. Such relay 216 provides built-in mechanisms to prevent power transfer under less than ideal circumstances.

Figure 4:
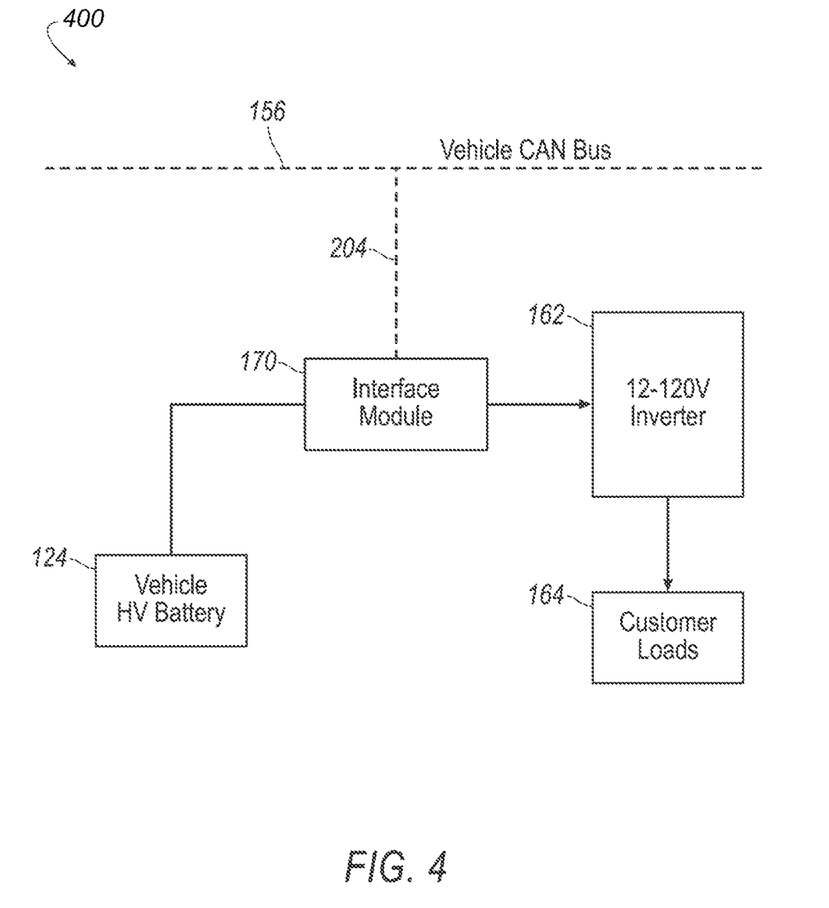
FIG. 4 illustrates an example block diagram for a high voltage vehicle interface for the system of FIG. 1.

FIG. 4 illustrates an example block diagram for a high voltage system 400. Similar to the low voltage system 300, the high voltage system 400 may include the interface 170 configured to connect to the inverter 162 to supply customer load 164. The interface 170 may also connect to the traction battery 124 to provide a high voltage to the inverter 162. The interface 170 may be configured to only provide voltage to the inverter in response to the vehicle being keyed on. This signal may be provided from the CAN bus 204 via the vehicle CAN 156. Again, the interface 170 may also monitor the system voltage to prevent low voltage conditions or over-current conditions.

Figure 5:
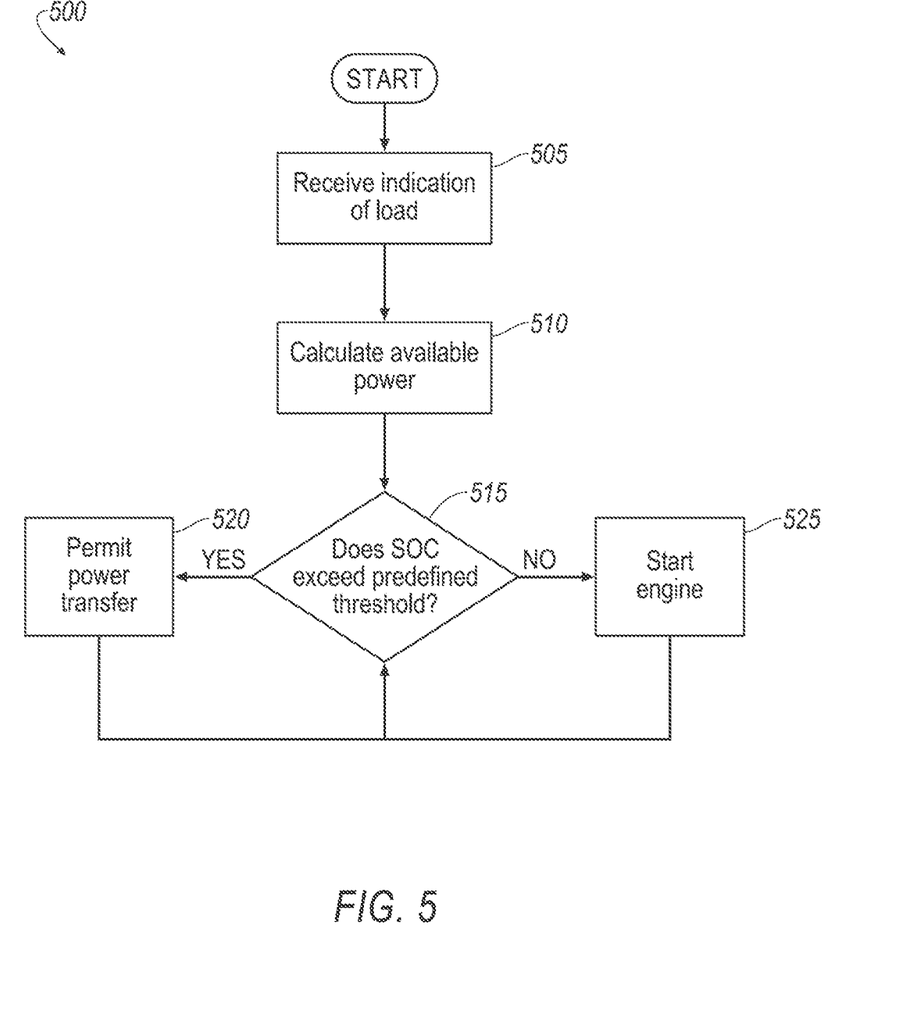
FIG. 5 illustrates an example flow chart for the system of FIG. 1.

FIG. 5 illustrates an example flow chart for the system of FIG. 1.

The process 500 may begin at block 505 where the interface 170 may receive an indication of a load from the first power cable 182. The load may be detected by the first connector 172. This load indication may be in response to the first connector 172 being completely seated. This may be determined by receiving an indication of a completed circuit such as a predetermined resistance. A nominal voltage (e.g., 12V) may be used to test whether the circuit has been closed by the pilot connector.

Additionally or alternatively, the load indication may include a handshake over the CAN 156 to verify and authorize the interface 170. This may include an exchange of predefined keys, transmission of a particular waveform to identify an authorized inverter, etc.

At block 510, the controller 148 may determine the available power. The available power may be the maximum power available to the interface 170 and inverter 162. The available power may be the available power of the traction battery 124. In another example, the available power may be that of the auxiliary battery 130, or the power allocated by the user via an associated user interface or HMI of the vehicle 112 and/or interface 170.

At block 515, the controller 148 may receive the SOC for at least one battery 124, 130 and determine whether the battery SOC is above a predefined threshold. If so, the process 500 proceeds to block 520. If not, the process 500 proceeds to block 525.

At block 520, in response to the SOC exceeding the threshold, the controller 148 may control the interface 170 to allow power to transfer from the at least one battery 124, 130 to the interface 170, and thus to the inverter 162 and associated auxiliary load(s) 164.

At block 525, in response to the SOC falling below the predefined threshold, the controller 148 may start the engine. The vehicle 105 may then supply the interface 170 with necessary power, including power supplied from the engine and the traction battery 124. In this example, energy may be converted to electric current via the electric machine and power electronics module. The engine may be operated until the SOC is above a second predefined threshold. The second predefined threshold may be higher than the first predefined threshold.

The controller 148 may continuously monitor the SOC to ensure that enough power can be supplied to the inverter 172. The engine may be turned on and off according the first and second thresholds.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle interface system configured to be arranged between a vehicle and an off-board inverter, comprising:
   a first cable configured to connect to the vehicle via a first connector;
   a second cable configured to connect to the off-board inverter via a second connector; and
   a transceiver configured to transmit interface data to the vehicle indicating the presence of a load connected at the second connector and receive vehicle data including instructions to control transmission of power from the first connector to the second connector.

2. The interface system of claim 1, wherein the first cable is configured to connect to a vehicle power plant.

3. The interface system of claim 2, wherein the first cable is configured to connect to one of an auxiliary battery or traction battery of the vehicle power plant.

4. The interface system of claim 1, wherein the presence of the load is indicated by a predefined resistance.

5. The interface system of claim 1, further comprising a controller configured to determine whether the vehicle data indicates a state of charge above a predefined threshold.

6. The interface system of claim 5, wherein the controller is further configured to instruct to transmit power from the first connector to the second connector in response to the state of charge exceeding the predefined threshold.

7. The interface system of claim 5, wherein the controller is further configured to transmit instructions to the vehicle to start a vehicle engine in response to the state of charge not exceeding the predefined threshold.

8. The interface system of claim 7, wherein the controller is further configured to transmit instructions to stop the engine in response to the vehicle data indicating that the state of charge exceeds the predefined threshold.

9. The interface system of claim 1, wherein the vehicle data indicates whether the vehicle has been keyed on.

10. A vehicle system configured to be arranged between a vehicle and an off-board inverter, comprising:
    an interface;
    a first cable configured to connect the interface to the vehicle via a first connector; and
    a second cable configured to connect the interface to the off-board inverter via a second connector;
    the interface including a controller configured to
      instruct a transceiver to transmit interface data to the vehicle indicating the presence of a load connected at the second connector; and
      control power transmission between the first connector and second connector.

11. The system of claim 10, wherein the first cable is configured to connect to a vehicle power plant.

12. The system of claim 11, wherein the first cable is configured to connect to one of an auxiliary battery or traction battery of the vehicle power plant.

13. The system of claim 10, wherein the presence of the load is indicated by a predefined resistance.

14. The system of claim 10, wherein the controller is further configured to determine whether the vehicle data indicates a state of charge above a predefined threshold.

15. The system of claim 14, wherein the controller is further configured to transmit power from the first connector to the second connector in response to the state of charge exceeding the predefined threshold.

16. The system of claim 14, wherein the controller is further configured to transmit instructions to the vehicle to start a vehicle engine in response to the state of charge not exceeding the predefined threshold.

17. The system of claim 16, wherein the controller is further configured to transmit instructions to stop the engine in response to the vehicle data indicating that the state of charge exceeds the predefined threshold.

18. The system of claim 10, wherein the vehicle data indicates whether the vehicle has been keyed on.

19. An electrified vehicle auxiliary power interface, comprising:
   an input connector configured to connect to an electrified vehicle;
   an output connector configured to connect to an auxiliary load;
   a transceiver configured to transmit data to the electrified vehicle indicating a load connected to the output connector and to receive vehicle data including instructions to transmit power from the input connector to the output connector;
   a power relay; and
   a controller configured to operate the power relay in response to the instructions received by the transceiver to transmit power from the input connector to the output connector.

20. The electrified vehicle auxiliary power interface of claim 19, wherein the controller is configured to stop power transmission from the input connector to the output connector in response to vehicle data received from the transceiver indicating a battery state-of-charge is below an associated threshold.

* * * * *